(No Model.) 2 Sheets—Sheet 1.

A. & H. NORMANTON.
FLEXIBLE TIRE.

No. 496,949. Patented May 9, 1893.

Witnesses
Inventors
Alfred Normanton.
Herbert Normanton.
their Atty.

(No Model.)  2 Sheets—Sheet 2.
A. & H. NORMANTON.
FLEXIBLE TIRE.
No. 496,949.   Patented May 9, 1893.
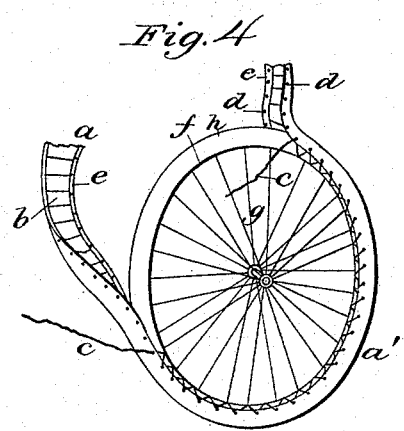
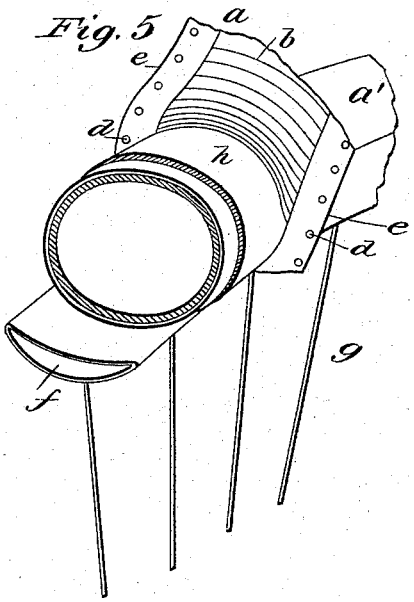
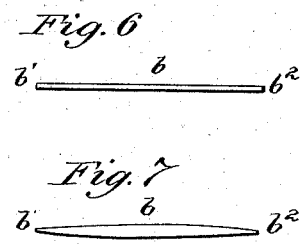
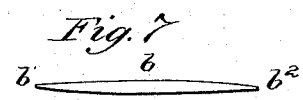
Witnesses
Inventors
Alfred Normanton.
Herbert Normanton.

UNITED STATES PATENT OFFICE.

ALFRED NORMANTON AND HERBERT NORMANTON, OF MANCHESTER, ENGLAND.

FLEXIBLE TIRE.

SPECIFICATION forming part of Letters Patent No. 496,949, dated May 9, 1893.

Application filed January 7, 1893. Serial No. 457,640. (No model.) Patented in England July 17, 1891, No. 12,139.

*To all whom it may concern:*

Be it known that we, ALFRED NORMANTON and HERBERT NORMANTON, both subjects of the Queen of Great Britain, residing at Manchester, in the county of Lancaster, England, have invented a certain new and useful Improvement in Flexible Tires for Wheels, (for which we have received a patent in Great Britain, No. 12,139, dated July 17, 1891,) of which the following is a full, clear, and exact description.

This invention relates to protectors primarily for pneumatic tires, but is alike applicable to all descriptions of flexible tires such as are used on bicycles, tricyles and light road vehicles, and the object of this invention is to prevent the perforation and consequent destruction of pneumatic tires, or injury to other forms of flexible tires when running over stony ground, newly metaled roads, and uneven surfaces. We attain this object by the means hereinafter described, and as illustrated in the accompanying two sheets of drawings.

In the several views shown therein similar letters refer to similar parts.

Figure 1:
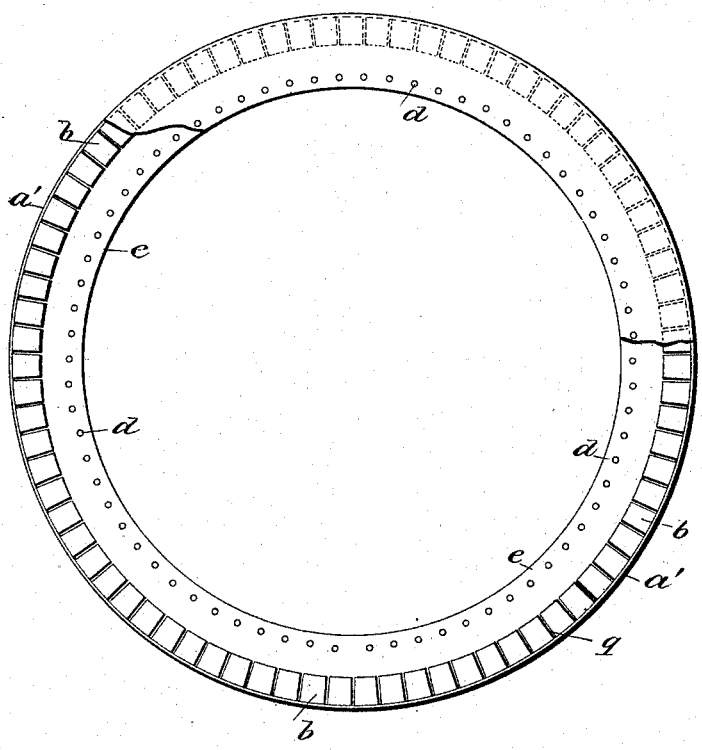
Figure 2:
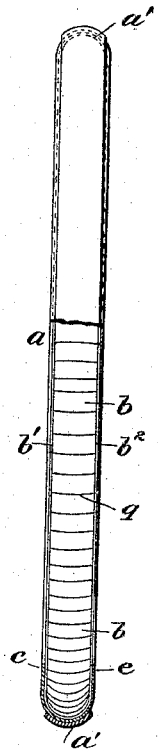
Figure 3:
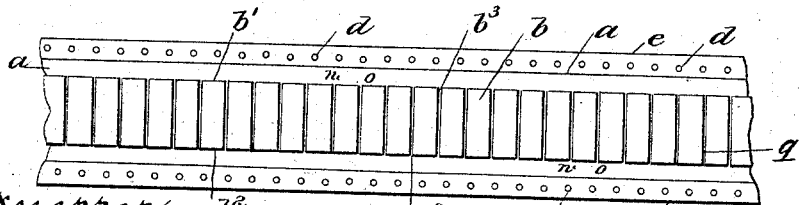

Figure 1 is a side view of a protector or shield constructed according to this invention, with one side partly removed to show the interior. Fig. 2 is an edge view of the same partly in section. Fig. 3 is a portion of the same protector or shield stretched out flat in order that the construction may be clearly defined. Fig. 4 is a perspective view of a wheel having a pneumatic tire with the aforesaid protector or shield applied. Fig. 5 shows a portion of the same wheel in section drawn to an enlarged scale. Figs. 6, 7, and 8 are details of the protecting pads.

In this invention we construct a shield or protector for tire in the form of a covering, by means of a band or strip of strong canvas or other like material, and rubber vulcanized together, of a length sufficient to be placed round the outer edge of the wheel, and of a width sufficient to cover the tire. Said canvas and rubber strip $a$, may be formed flat as in Fig. 3, but we prefer to treat the canvas and rubber so as to mold it into a semicircular or U shape, as represented in Figs. 1 and 2 with a rubber wearing surface at $a'$ and canvas edges $e$.

We attach to the inside in the center of aforesaid band or strip $a$ by cementing thereto or by other preferred means a succession of narrow pieces or pads of leather or other non-penetrable material $b$. The length in a forward direction from $n$ to $o$ of each of these pieces of leather or material is preferably such as will correspond to the length or extent of that portion of the tire that may rest on the ground at any one moment. We affix said pieces or pads of leather to the inside of the hereinbefore described canvas band $a$ in the positions as represented in Fig. 3, with their convergent edges $q$ slightly apart when said shield or protector is placed out flat, so as not to overlap each other, and perfectly level on the surface. These pads of leather may be either of a uniform thickness as in Fig. 6 or they may be thicker in the center than at the edges as in Fig. 7, and may be either flat strips or molded to any required curve as in Fig. 8. The width of these pads from $b'$ to $b^2$ may be varied according to the extent of the surface of the tire it is desired to protect, and said pads may be covered over on the inside with a thin lining or covering of india rubber, or other like material.

In applying this our invention to a pneumatic or other tire, we place the strip or band $a$ to which the pads $b$ are affixed, over and around the outside of said tire, so that the aforesaid pads come over the wearing surface of the tire, and the selvage edges $e$ of the band $a$, extending up over the edges of the rim F of the wheel $g$. We pass a lace $c$, which is preferably elastic through the eyelet holes $d$, formed near the edges of the band $a$, and cross said lace backward and forward over the back of the rim of the wheel, as in Fig. 4, thereby securely fastening the cover forming the shield or protector over and to the tire $h$. The aforesaid lace is preferably elastic, but leather or other like laces may be used. By these means a perfect shield or protector is formed, as when the weight on the tire causes said tire to deflect or flatten on the tread, or that part that is in contact with the surface of the road, the hereinbefore described leather pads $b$ are brought close together at the divisions $b^3$, and practically form a continuous non-penetrable covering, while yielding or adapting itself to the compression of the tire.

Having now described our invention, what we claim as new, and desire to secure by Letters Patent, is—

A shield or protector in the form of a covering, constructed of a succession of narrow pads of leather or other non-penetrable substance, secured to the inside of a strip or band of canvas or like material, having an india-rubber wearing surface, the convergent edges of said pads being slightly apart when the shield or protector is placed out flat, in order that said pads may not overlap each other when placed round the tire, and may have a perfectly level surface for placing over and around any perfectly finished and completed pneumatic or other elastic tire, in the manner and for the purpose substantially as hereinbefore described.

In testimony whereof we have hereunto set our hands this 15th day of December, A. D. 1892.

ALFRED NORMANTON.
HERBERT NORMANTON.

Witnesses:
EDWARD BARBER,
THOMAS PRESCOTT.